United States Patent
Barsness et al.

(10) Patent No.: US 8,645,745 B2
(45) Date of Patent: *Feb. 4, 2014

(54) DISTRIBUTED JOB SCHEDULING IN A MULTI-NODAL ENVIRONMENT

(75) Inventors: Eric L. Barsness, Pine Island, MN (US); David L. Darrington, Rochester, MN (US); Ray L. Lucas, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 310 days.

This patent is subject to a terminal disclaimer.

(21) Appl. No.: 13/033,938

(22) Filed: Feb. 24, 2011

(65) Prior Publication Data
US 2012/0221886 A1    Aug. 30, 2012

(51) Int. Cl.
*G06F 9/46* (2006.01)
(52) U.S. Cl.
USPC ............... 714/4.11; 714/1; 714/6.3; 718/105
(58) Field of Classification Search
CPC .................................................... G06F 9/5072
USPC ........................................... 714/4.1; 718/105
See application file for complete search history.

(56) References Cited

U.S. PATENT DOCUMENTS

| | | | |
|---|---|---|---|
| 2005/0216733 A1* | 9/2005 | Keohane et al. | 713/156 |
| 2005/0267929 A1* | 12/2005 | Kitamura | 709/201 |
| 2005/0267950 A1* | 12/2005 | Kitamura | 709/219 |
| 2005/0283786 A1* | 12/2005 | Dettinger et al. | 718/104 |
| 2007/0028242 A1* | 2/2007 | Martin et al. | 718/102 |
| 2007/0260723 A1* | 11/2007 | Cohen et al. | 709/223 |
| 2008/0256223 A1* | 10/2008 | Chan et al. | 709/223 |
| 2009/0031312 A1* | 1/2009 | Mausolf et al. | 718/102 |
| 2009/0271472 A1* | 10/2009 | Scheifler et al. | 709/202 |
| 2010/0122256 A1* | 5/2010 | Darrington et al. | 718/102 |
| 2010/0223618 A1 | 9/2010 | Fu et al. | |
| 2012/0221886 A1* | 8/2012 | Barsness et al. | 714/4.2 |

* cited by examiner

*Primary Examiner* — Chae Ko
(74) *Attorney, Agent, or Firm* — Patterson & Sheridan LLP

(57) ABSTRACT

Techniques are described for decentralizing a job scheduler in a distributed system environment. Embodiments of the invention may generally include receiving a job to be performed by a multi-nodal system which includes a cluster of nodes. Instead of a centralized job scheduler assigning the job to a node or nodes, each node has a job scheduler which scans a shared-file system to determine what job to execute on the node. In a job requiring multiple nodes, one of the nodes that joined the multi-nodal job becomes the primary node which then assigns and monitors the job's execution on the multiple nodes.

16 Claims, 5 Drawing Sheets

DISTRIBUTED JOB SCHEDULING IN A MULTI-NODAL ENVIRONMENT

BACKGROUND

A computer cluster—referred to as a cluster for short—is a type of computer system which completes computing jobs by means of multiple collaborative computers which are connected together. These computing resources share a unified management policy and provide services to users as a whole. A single computer in a cluster system is typically called a computing node.

The cluster system has many advantages. For example, the cluster system, when working in a load-balance manner, can achieve a higher efficiency by dividing work and using multiple computers. The cluster system may also work in a master/slave server manner. Once a master server fails, a slave server provides services to users as a substitute for the master server, thereby exhibiting a high fault-tolerance.

Since the cluster system normally comprises of large amounts of computing resources which work together collectively, each incoming job must be apportioned the correct amount of system resources. This process is referred to as job scheduling. In general, job scheduling includes mapping jobs to corresponding computing resources for execution based on a job's characteristics and scheduling policies.

A typical scheduling approach uses a centralized job scheduler that assigns jobs in a queue to nodes with the requisite resources. Since the job scheduler parses through each node to find one allocated to run the job, the scheduling efficiency is reduced in a cluster scheduling system with a large number of computing nodes. In large-scale multi-nodal system, such as BlueGene or Symmetric Multiple processing (SMP), there could be as many as 65,536 nodes though this number is increasing rapidly. Accordingly, a centralized job scheduler becomes less efficient as a multi-nodal system becomes more expansive.

In some situations, a centralized job scheduler does more than just assign jobs to computing nodes. A scheduler also may keep track of the number of nodes available, what types of jobs the node is currently performing, and the characteristics of the node—i.e., the types of jobs the node is allocated to perform. As the number of nodes increases, so does the workload of the scheduler. Continually adding nodes, however, increases the scheduler's workload and may create a bottleneck. Because a centralized scheduler is tasked with collecting and updating the current status of each node, the job scheduler is also a single point of failure. If the centralized scheduler fails, then the entire multi-nodal system cannot function.

SUMMARY

Embodiments of the invention provide a method, system and computer program product for scheduling jobs in a distributed computing environment by scanning a file system shared by a plurality of nodes in the distributed computing environment. The file system contains data describing a job to be performed by the distributed computing environment. Also, each of the plurality of nodes includes a processor, a memory, and a job scheduler specific to the respective node. Further, the scanning is performed by the job scheduler of a first node of the plurality of nodes. The method, system and computer program product include selecting the job by the job scheduler to be run on the first node.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1A:
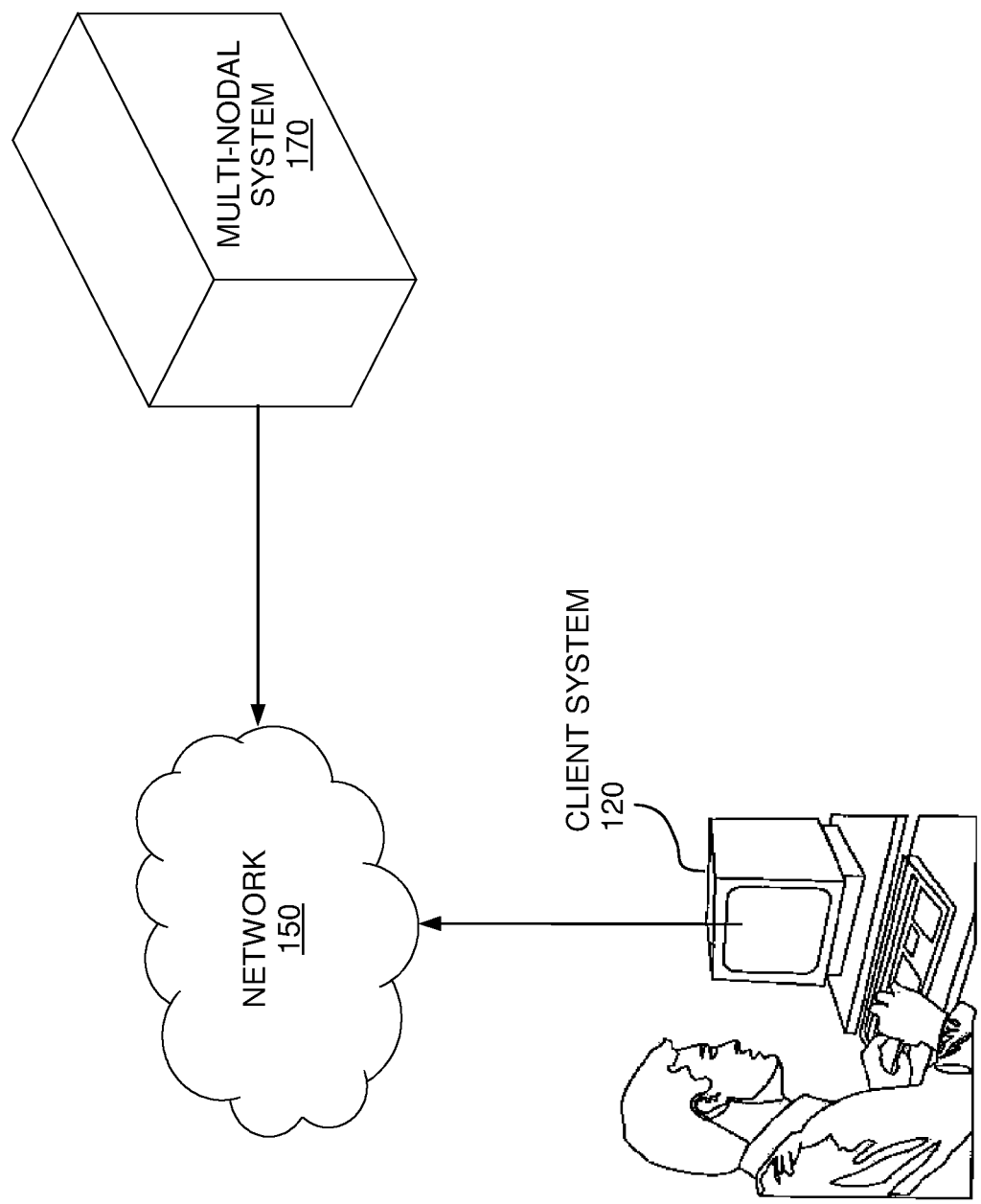
FIG. 1A-1B are block diagrams illustrating a networked system for performing client submitted jobs on a multi-nodal system, according to embodiments of the invention.

Distributed computing is a strategy for improving resource utilization on large numbers of computers, i.e., separate computers or nodes which collaborate to fulfill tasks. Distributed computing may focus on providing raw processing speed for computationally intensive problems (i.e., parallel processing) or distributing tasks during surges in workload (i.e., one advantage of cloud computing). In either embodiment, the job scheduler is tasked with assigning and coordinating the common tasks to each computing node. As distributed computing systems (e.g., multi-nodal systems) expand to include more nodes, a centralized job scheduler may create a bottleneck and slow down job throughput. Additionally, a centralized job scheduler is a single failure point.

In multi-nodal systems with a decentralized job scheduler, each node contains an individual copy of the job scheduler. In order to coordinate the nodes, each job scheduler may parse a shared-file system that contains all of the posted jobs. Before selecting a job, the local copy of the scheduler considers the specific characteristics of the node, e.g., whether the node has enough resources to perform the desired task. Upon selecting a job for the node, the job scheduler marks the job as pending, instructs the node to perform the job, and properly reports the results of the job.

In another embodiment, a posted job may require multiple nodes. In such a case, at least two job schedulers (each representing an individual node) choose to perform the task. One of the self-selected nodes is chosen to be the primary node. The job scheduler of the primary node then organizes the other nodes according to the job requirements and assigns each node a portion of the job. The job scheduler may also invoke the service of a local resource manager when apportioning the job. Further, even after the job is completed, the job scheduler of the primary node may search for another job on the shared-file system that requires the current nodal configuration before releasing the nodes to perform other tasks.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the shared-file system) or related data available in the cloud. For example, the node could execute on a computing system in the cloud and use the job scheduler to perform client tasks. In such a case, the node could perform the client task and store the results of the performed job at a storage location in the cloud. In such a case, the client system would send jobs to the multi-nodal system and the results would be stored at a storage location in the cloud. Doing so allows a client system to access this information from any computing system attached to a network connected to the cloud (e.g., the Internet).

Figure 1B:
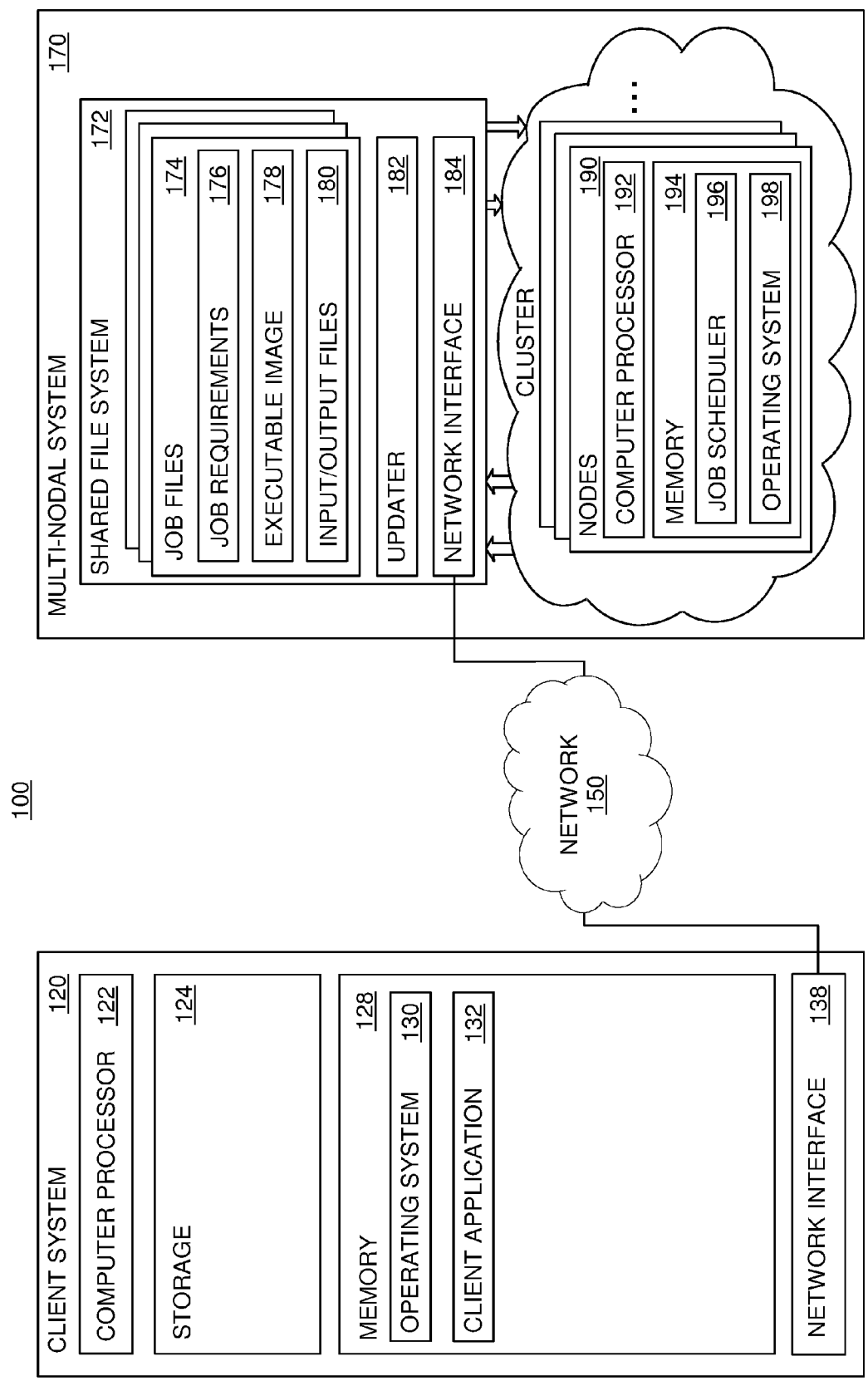

FIG. 1A-1B are block diagrams illustrating a networked system for performing client submitted jobs on a multi-nodal system, according to embodiments of the invention. As shown, FIG. 1A is a block diagram illustrating a networked system for performing client submitted jobs on a multi-nodal system. In the depicted embodiment, the system 100 includes a client system 120 and a multi-nodal system 170, connected by a network 150. Generally, the client system 120 submits jobs over the network 150 to a shared-file system running on the multi-nodal system 170. Nonetheless, any requesting entity may transmit jobs to the multi-nodal system 170. For example, software applications (such as an application running on the client system 120), operating systems, sub-systems, other multi-nodal systems 170 and, at the highest level, users may submit jobs. The term "job" denotes a set of commands for requesting resources from the multi-nodal system 170 and using these resources. Any object oriented programming language such as Java, Smalltalk, C++ or the like may be implemented to format the set of commands. Additionally, a multi-nodal system 170 may implement a unique programming language or provide a particular template. These jobs may be predefined (i.e., hard coded as part of an application) or may be generated in response to input (e.g., user input). Upon receiving the job, the multi-nodal system 170 executes the request and then returns the result.

FIG. 1B is a block diagram of a networked computer system configured to perform client submitted jobs on a multi-nodal system, according to one embodiment of the invention. As shown, the system 100 contains a client system 120 and a multi-nodal system 170. The client system 120 contains a computer processor 122, storage media 124, memory 128 and a network interface 138. The computer processor 122 may be any processor capable of performing the functions described herein. The client system 120 may connect to the network 150 using the network interface 138. Furthermore, as will be understood by one of ordinary skill in the art, any computer system capable of performing the functions described herein may be used.

In the pictured embodiment, memory 128 contains an operating system 130 and a client application 132. Although memory 128 is shown as a single entity, memory 128 may include one or more memory devices having blocks of memory associated with physical addresses, such as random access memory (RAM), read only memory (ROM), flash memory or other types of volatile and/or non-volatile memory. The client application 132 is generally capable of generating job requests. Once the client application 132 generates a job, the job may be submitted over the network 150 to a database (e.g., shared-file system 172) for execution. The operating system 130 may be any operating system capable of performing the functions described herein.

The multi-nodal system 170 contains a shared-file system 172 and at least one node 190. The shared-file system 172 includes at least one job file 174, an updater 182, and a network interface 184. In one embodiment, the shared-file system 172 is accessible by every node 190. Each job file 174 contains the job requirements 176, an executable image 178, and I/O files 180. In particular, the job requirements 176 include the information necessary to execute the job—e.g., the number of nodes required or the nodal configuration. The executable image 178 may be the program executable or a reference that indicates where the program executable is found. Similarly, the I/O files 180 may contain the necessary input and desired output of the job or a reference to where these files are located. The updater 182 maintains a record of which job files are pending, i.e., being performed by a node 190. After a node 190 selects a particular job file 174, the updater 182 prevents another node 190 from selecting the same job file 174. The network interface 184 connects to the network 150 and receives the job files 174 sent from the client system 120. Furthermore, as will be understood by one of ordinary skill in the art, any computer system capable of performing the functions described herein may be used.

The nodes 190 contain a computer processor 192 and memory 194. The computer processor 122 may be any processor capable of performing the functions described herein. The memory 194 contains a job scheduler 196 and an operating system 198. The operating system 198 may be any operating system capable of performing the functions described herein. The job scheduler 196 parses the shared-file system 172 and chooses a job (i.e., a job file 172) for the node 190 to perform. Further, the job scheduler 196 may use characteristic information about the node 190, such as the number of processors 192 or amount of memory 194 contained on the node 190, to determine what types of jobs are allocated to the particular node 190. The job scheduler 196 may also maintain records of other nodes 190 that do (or do not) function well with the node 190 when performing jobs that require multiple nodes. The various attributes of the job scheduler 196 will be discussed in greater detail below.

Figure 2:
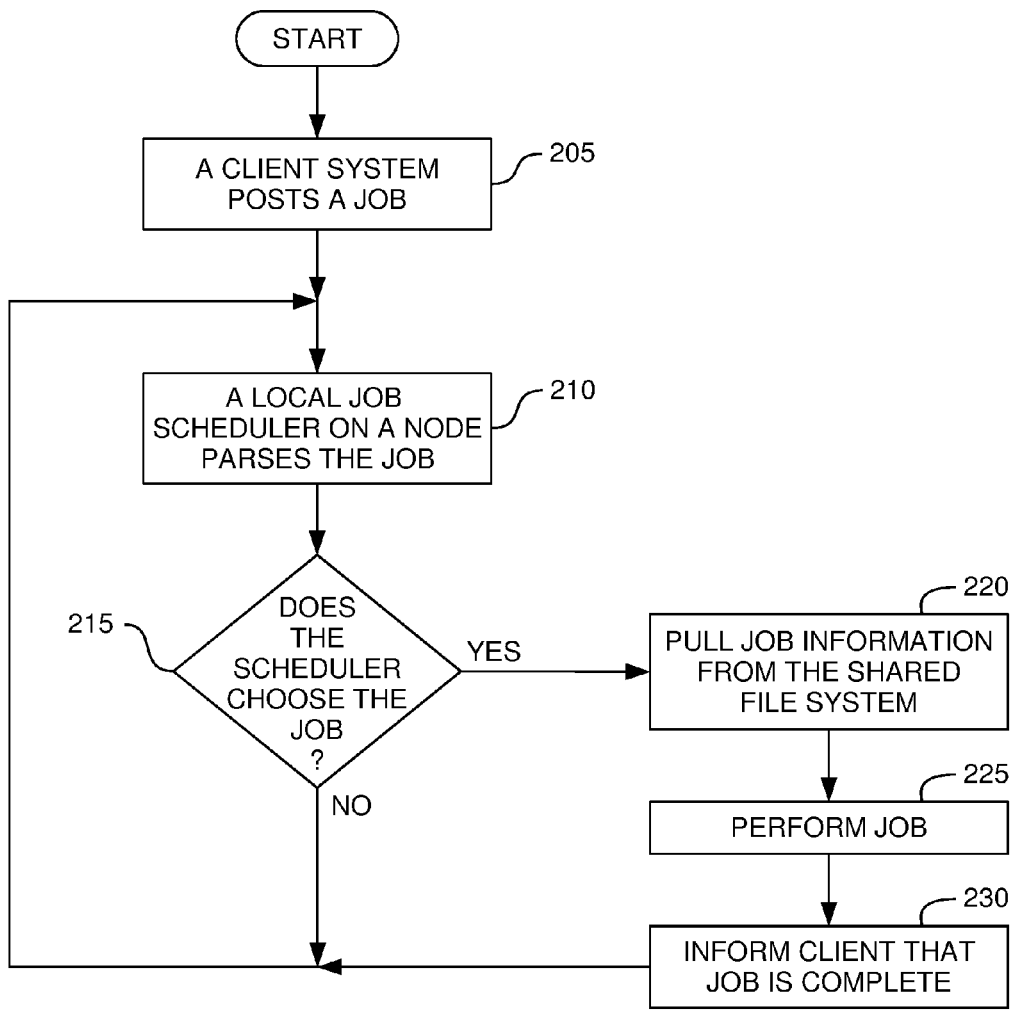
FIG. 2 is a flow diagram illustrating methods of managing a decentralized job scheduler, according to embodiments of the invention.

FIG. 2 is a flowchart illustrating a method of executing client-submitted jobs on a multi-nodal system 170, according to one embodiment of the invention. At step 205, the client system 120 sends a job file 172 to the multi-nodal system 170 via the network 150. In other embodiments, the client system 120 may send a job request after filling out a template or without specific instructions. In such a case, the multi-nodal system 170 would take the client-submitted job and create a job file 174. In general, the job file 174 contains the job requirements 176, the executable image 178, and the I/O files 180. The job requirements 176 may inform prospective nodes 190 how many processors 192 are necessary for the job, or the expected size of the I/O file 180. Thus, the job requirements 176 provide enough information to the node 190 to determine whether the node 190 can successful perform the job. In addition to limiting the type of node 190 capable of performing a particular job, the job requirements 176 may provide instructions for performing the job. For example, in a multi-nodal process, the nodal configuration may require a 3×3×3 nodal configuration. This multiple-node configuration will be discussed in more detail below with FIG. 4. Further, the job requirements 176 may contain instructions on how the node 190 should notify the client system when the job is finished and where to return the requested results, e.g., the I/O file 180. If the job was submitted by a user, then notification may be accomplished by e-mail, text message, automated phone call, or the operating system 130 outputting an alert, such as a pop-up window or audio beep. The job's results could be returned via the network 150. In many cases dealing with multi-nodal systems 170, the results may be too large to transmit via the network 150. In such cases, the results may be stored on physical media—e.g., CD-ROM, DVD, or hard drive.

The executable image 178 may either be the actual program executable or a reference to the executable. Similarly, the I/O files 180 may contain only references to the files' locations. Storing merely references to the executable or I/O files 180 advantageously allows the size of the job file 174 to be minimized, thereby reducing the time necessary for a job scheduler 196 to scan the shared-file system 172. Besides decreasing the time necessary to poll (i.e., scan), a multi-nodal system 170 may have different file systems that are used by each node 190. In such a case, after a node 190 selects a job, the executable image 187 and I/O files 180 may be transferred to the preferred or assigned file system for that node 190.

In one embodiment, the multi-nodal system 170 posts each submitted job file 174 on the shared-file system 172. This central repository is not limited to any particular implementation of storing data. Rather, the shared-file system 172 may be a database, disc, memory hierarchy, or any other suitable data collection system that performs the functions described herein. In addition to storing the job files 174 at a central location, the shared-file system 172 may include information that aids the job schedulers 196 when selecting job files 174 to execute (step 210). For example, the shared-file system 172 may keep track of the number of nodes performing jobs. Using this information, a job scheduler 174 can estimate how long the node 190 may have to wait for a job that requires multiple nodes 190. If almost all nodes 190 are currently busy, then at step 210 the job scheduler 174 may choose a job that requires only a single node 190 rather than choosing a job that requires multiple nodes. Alternatively, knowing how many nodes are currently busy permits the job schedulers 196 to prioritize when to poll or scan the shared-file system 172. For example, if many of the nodes 190 are currently idle, then an idle node 190 may reduce the number of times its job scheduler 196 polls the shared-file system 172 to save energy. In other words, because many nodes are constantly polling the same job files, these idle nodes 190 can poll less frequently. Conversely, if many of the nodes 190 are busy, an idle node 190 may constantly scan to find a job since many of the other nodes 190 are unavailable and therefore are not polling the shared-file system 172. Without constant polling, a newly posted job may remain unexecuted for longer periods.

The shared-file system 172 also includes an updater 182. The updater 182 maintains a record of which job files 174 are pending, i.e., being performed by a node 190. For example, after a node 190 selects a particular job file 174, the job scheduler 196 may either mark the job file as pending or inform the updater 182 that the node has accepted the job. Accordingly, the updater 182 either scans the shared-file system 172 searching for marked job files or waits for notification from a job scheduler 196 that a job file 124 is now "checked out". The updater 182 could then mark the job file 124 as pending. This mark notifies any subsequent job scheduler 196 that the job file 174 has already been accepted. Alternatively, the updater 182 may maintain a record of the checked out job files 174 and require a job scheduler 196 to obtain permission before performing a job. In sum, the updated 182 prevents another node 190 from selecting the same job file 174.

At step 210, the job schedulers 196 poll the shared-file system 172 searching for posted job files 174. As mentioned above, the shared-file system 172 may aid this process by informing the schedulers 196 on how often to scan. Moreover, in many multi-nodal systems 170, not every node 190 is suited to perform every job. Thus, if the only job files 174 remaining are for jobs that an idle node 190 is not allocated to perform, the node 190 may scan less frequently. This information could be stored in a look-up table or index that allows a node 190 to quickly discover if there are jobs that the node 190 is suited for.

In one embodiment, before selecting a job, the job scheduler 196 compares the characteristics of the node 190 with the job requirements 176 found in the job file 174 (step 215). The job requirements 176 may include the number of desired computing nodes, required computational ability of each node, required available memory of a node, and so forth. By characterizing the nodes, different descriptions of jobs can be summarized and classified. In other words, various jobs may require a node which is configured in a unique way. The following is an inexhaustive list of jobs that may necessitate specially configured nodes. Those skilled in the art will appreciate that the described examples are just for facilitating the understanding of the present invention, rather than limiting the present invention to these exemplary applications.

First, experimental jobs which may originate from particular groups, such as students or faculty, or be based on research or predictive models.

Second, computing-intensive jobs which demand a large number of nodes—e.g., more than 1024—and require that the nodes 190 to contain a large number of CPUs (e.g., more than four pathways).

Third, data-intensive jobs which require large amounts of shared storage space (e.g., more than 1 TB), large amounts memory on each node (e.g., more than 16 GB), and high I/O bandwidth.

Fourth, communication-intensive jobs which require full wire-speed interconnections between nodes and assurances of communication redundancy between nodes.

Fifth, AIX® jobs which require the executor to be compiled for an AIX® system and that the nodes 190 each be using AIX® as the operating system 198.

Sixth, x86 jobs which require the nodes 190 to have x86 compatible CPU architectures.

As shown by the list of different types of jobs described above, the different characteristics of the nodes 190 may be used to determine if two nodes function well together when participating in a particular multi-nodal job. For example, the type of operating system 198 (e.g., UNIX or AIX) used on each node 190 as well as the different processor architectures and available memory may determine whether two nodes would function well together when participating in a specific job.

Alternatively, historical data may be monitored and recorded. For example, the network latency between NODES A and B may be much less than between NODES A and C which may be recorded in the memory 194 of the respective nodes. If a particular multi-nodal job requires a lot of inter-node data transfer, the scheduler 196 on NODE C may not want to choose the job once the job scheduler 196 determines that NODE A has already selected the job. Conversely, NODE C may use recorded history to recognize the low latency with NODE A and select the job based simply on NODE A's participation. In addition to considering network latency, the historical data may record the number of times two nodes have participated in a multi-nodal job together. Once this number reaches a threshold, for example, the job scheduler 190 may use the historical data to determine whether to accept a job based on another node's participation. One of ordinary skill will recognize that a variety of different interactions between two nodes may be recorded as historical data besides the two mentioned above that define a relationship between two nodes in the distributed computing system.

According to one embodiment, the job scheduler 196 selects the job according to the job requirements 176. For example, the job scheduler 198 determines the job with corresponding job requirements 176 that most closely match the characteristics of the node 190. Advantageously, a decentralized job scheduler provides each node 190 with the ability to choose the job which suits it best. Moreover, if the characteristics of a node 190 changes—e.g., the memory 194 is expanded—only the job scheduler 196 found on the node 190 must be updated. Conversely, in a centralized job scheduler scheme, the scheduler constantly checks for any changes in the nodal characteristics. Additionally, whenever a centralized job scheduler distributes a new job, the scheduler must compare the characteristics of each node to the job requirements—i.e., the scheduler evaluates one job at a time. Instead, a decentralized job scheduler may implement more of a pipeline approach. For example, if there are three posted jobs (job A-C) and three idle nodes (node A-C), then node A can evaluate job A while node B evaluates job B and node C evaluates job C. Thus, potentially, each job may be assigned simultaneously rather than one job at a time.

In another embodiment, the node 190 may perform only certain jobs. For example, the administrator of a certain node 190 may wish that the node 190 be used to further research of the human genome, but not used to monitor current weather patterns. Thus, the job scheduler 196 may take this nodal preference into account and refuse any jobs that entail weather patterns. Unlike centralized job schedulers, decentralized job schedulers 196 provide nodes 190 with the ability to control what work is performed on the nodes 190.

In sum, at step 215, the job scheduler 196 may use any of the considerations disclosed above to decide whether to accept an unassigned job. However, one of ordinary skill in the art will realize that other methods may be used that perform the functions described above.

If a job scheduler 196 does not choose the currently evaluated job, the scheduler 196 evaluates the next job or decides whether to poll the shared-file system 172 again. If, however, the scheduler 196 selects a job, at step 220 the node 190 then pulls the job file 174 from the shared-file system 172. In one embodiment, the node 190 copies the necessary information to the local memory 194. If the executable image 178 and I/O files 180 are references, then the node 190 uses the references to find and copy the executable image 178 and I/O files 180. Alternatively, the node 190 may transfer the information from the job file 174 to a database assigned to the node 190. In both cases, however, the node 190 may mark the job file 174 as pending or inform the updater 182 that the job is pending to prevent redundancy.

Finally, the node 190 performs the job during step 225 and informs the client system 120 that the job is complete at step 230. The job scheduler 194 or node 190 uses the job requirements 176 to determine how the client system 120 should be notified. This embodiment does not depend on any particular method of communication and any typical form of communication between a client system 120 and a centralized job scheduler may similarly be used in a multi-nodal system 170 that implements a decentralized job scheduler 196. Also, the results of the job may be communicated to the client system 120 in the same manner as a system that uses a decentralized job scheduler as with a system that uses a centralized job scheduler. After the node 190 finishes performing the job and recording the results, the job scheduler 194 begins again to parse the shared-file system 172.

Figure 3:
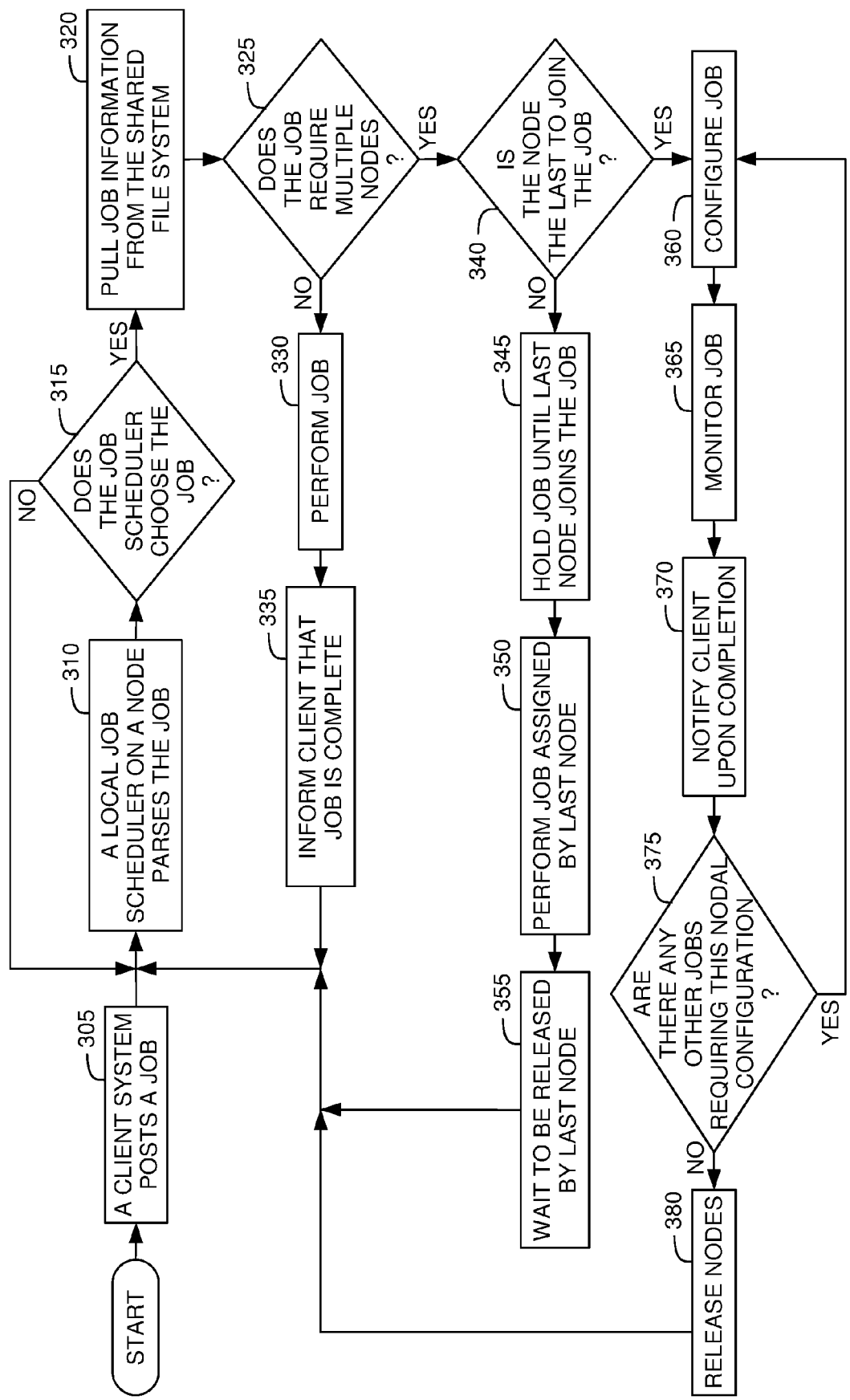
FIG. 3 is a flow diagram illustrating methods of managing a decentralized job scheduler, according to embodiments of the invention.

FIG. 3 is a flowchart illustrating a method of executing client-submitted jobs on a multi-nodal system 170, according to one embodiment of the invention. Referring to FIG. 2, FIG. 3 also includes a client system 120 which posts jobs on a shared-file system (step 305), a job scheduler 174 that scans the shared-file system (step 310), selects a job file 174 (step 315), and pulls the job file 174 from the shared-file system 172 (step 320). The discussion accompanying FIG. 2, however, was limited to jobs which required only one node to perform. Instead, FIG. 3 illustrates a system that performs multi-nodal jobs—i.e., jobs that require more than one node to execute. Accordingly, though not illustrated in FIG. 3, a node's job scheduler 194 may ensure that the multi-nodal job would be an efficient use of the node's resources. For example, the job requirements 176 contain information about the nodal configuration necessary to complete the job. Even if the job characteristics match the characteristics of the node 190, the job scheduler 194 may check the updater 182 to determine the number of available nodes 190. If most of the nodes 190 are busy, however, the job scheduler 194 may refuse the job in favor of another job that requires only one node 310. Thus, the node 190 does not have to wait for other nodes 190 to join the multi-nodal job.

After the node 190 selects a job during step 315 and pulls the job information at step 320, the node 190 determines the type of nodal configuration that is specified by the job requirements at step 325. If the job requirements 176 only require the use of one node, then the node 190 progresses much like in FIG. 2, i.e., the node performs the job at step 330 and informs the client system 120 that the job is complete during step 335. However, if the job specifies a multi-nodal configuration, at step 340 the node 190 establishes whether the node 190 is the last node to accept the job. A node 190 may determine if it is the last node 190, for example, by each preceding node 190 recording in the job requirements 176 that the preceding node 190 has accepted the job. Accordingly, the final node 190 would accept the job, determine how many nodes 190 are required, establish how many nodes 190 have previously joined by checking the job requirements 176, and then determine whether it is the final node 190.

Figure 4:
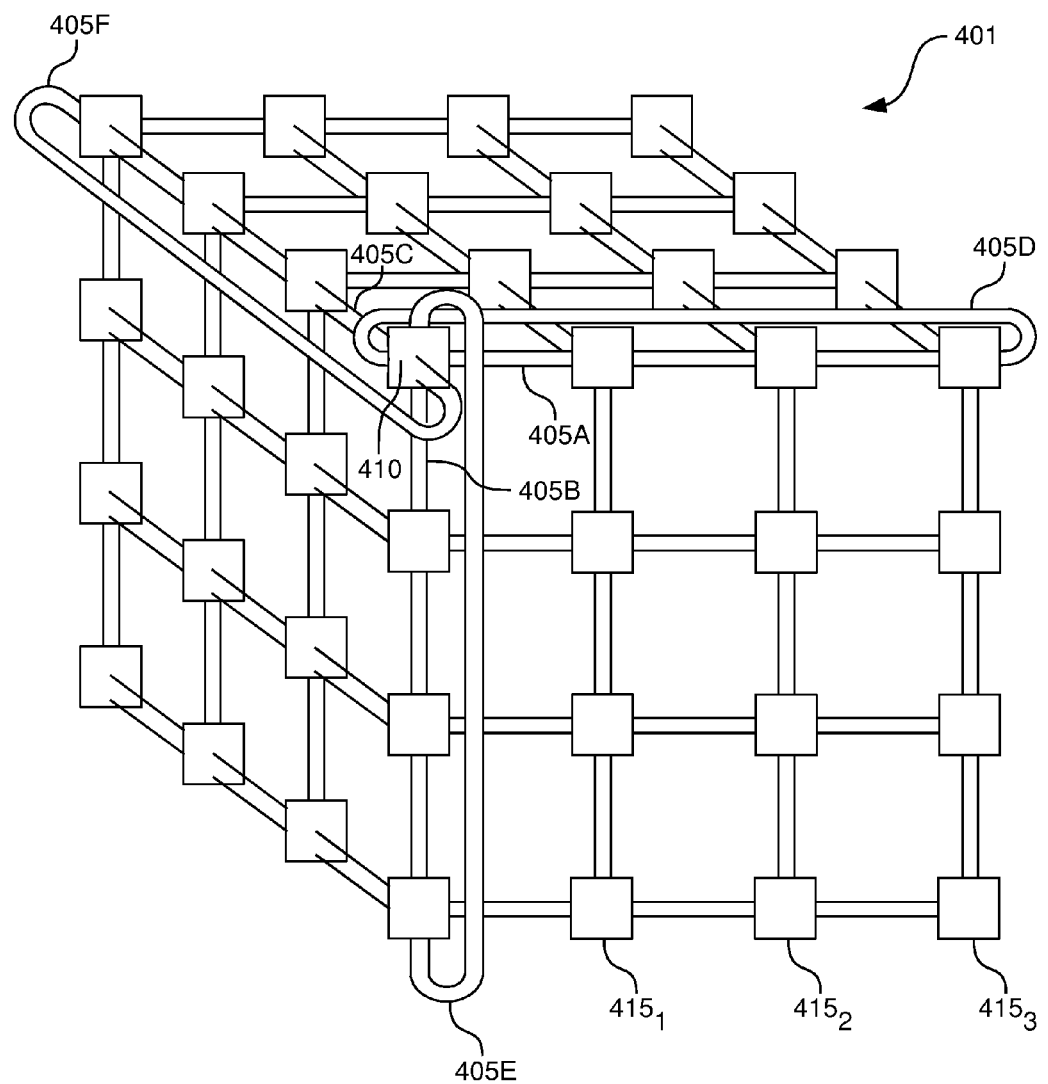
FIG. 4 is a diagram illustrating a multi-nodal job construct, according to embodiments of the invention.

In one embodiment, the last node 190 becomes the primary node. One responsibility of the primary node is to establish the nodal configuration for a multi-nodal job. For example, the nodal configuration shown in FIG. 4 is a conceptual illustration of a three-dimensional torus network of a multi-nodal system 170. More specifically, FIG. 4 illustrates a 4×4×4 torus 401 of compute nodes 190, in which the interior nodes are omitted for clarity. Although FIG. 4 shows a 4×4×4 torus having 64 nodes, it will be understood that the actual number of compute nodes in a parallel computing system is typically much larger, for instances, a Blue Gene/L system includes 65,536 compute nodes. Each compute node 190 in the torus 401 includes a set of six node-to-node communication links 405A-F which allows each compute nodes in torus 401 to communicate with its six immediate neighbors, two nodes in each of the x, y and z coordinate dimensions.

As used herein, the term "torus" includes any regular pattern of nodes and inter-nodal data communications paths in more than one dimension, such that each node has a defined set of neighbors, and for any given node, it is possible to determine the set of neighbors of that node. A "neighbor" of a given node is any node which is linked to the given node by a direct inter-nodal data communications path. That is, a path which does not have to traverse another node. The compute nodes may be linked in a three-dimensional torus 401, as shown in FIG. 4, but may also be configured to have more or fewer dimensions. Also, it is not necessarily the case that a given node's neighbors are the physically closest nodes to the given node, although it is generally desirable to arrange the nodes in such a manner, insofar as possible.

In one embodiment, the compute nodes in any one of the x, y or z dimensions form a torus in that dimension because the point-to-point communication links logically wrap around. For example, this is represented in FIG. 4 by links 405D, 405E and 405F which wrap around from a last node in the x, y and z dimensions to a first node. Thus, although node 413 appears to be at a "corner" of the torus, node-to-node links 405A-F link node 410 to nodes 405D, 405E and 405F, in the x, y and z dimensions of torus 401.

Moreover, the present embodiment assigns the last node to join as the primary node 410. Accordingly, all other nodes may be considered as slave nodes (labeled as $415_1$, $415_2$, and $415_3$). In this manner, the job scheduler 196 for the primary node 410 allocates the assignments to the slave nodes $415_{1-3}$. In another embodiment, if the nodal configuration requires hundreds, or even thousands of nodes 190, there may be multiple primary nodes 410 so as to prevent a single job scheduler 196 from causing a bottleneck. For example, a plurality of primary nodes 410 may form a hierarchy to create the nodal configuration and distribute assignments efficiently.

One of ordinary skill in the art will recognize that the last node to accept a job does not need to be the primary mode 410. For example, the first node could easily be elected, or after all the required nodes have joined, the node 190 with the most available memory or computational ability may be chosen. Alternatively, more than one node 190 may serve as the primary node with the duties being divided among the several primary nodes 410.

If the node 190 is not the last to join a multi-nodal job, at step 345 the node must wait until the last node 190 accepts the job. In at least one embodiment, the preceding node 190 records in the job requirements 176 a reservation. This reservation may serve dual purposes: first, the reservation informs subsequent accepting nodes 190 whether it is the last node 190, and second, sets a time stamp that serves as a limit to the reservation. Once the time stamp expires, the node 190 may no longer honor the reservation, thereby requiring another node 190 to accept the job. For example, assume that an administrator configures a NODE A to have a short reservation time because NODE A is too valuable to leave idle (e.g., NODE A contains the largest available memory). Assume JOB 1 requires three nodes and both NODE A and NODE B join the job. By the time NODE C joins, however, NODE A's reservation has expired, thus leaving NODE B and C to wait until another node 190 accepts the job. Further, a node 190 with an expiring reservation may record in the job requirements 176 that the node 190 is no longer participating so that the node 190 can be replaced.

In addition to reservations expiring, a job scheduler 196 may accept multiple jobs and file multiple reservations. Instead of simply waiting for a multi-nodal job to fill up, a job scheduler 196 may continue to parse the shared-file system 172 searching for another multi-nodal job. If one is found, the job scheduler 196 may also accept that job and place a reservation. In such a case, whichever multi-nodal job is ready to begin first (i.e., the requisite number of nodes have accepted the job) is the job file 174 that the node 190 accepts. Moreover, the job scheduler 196 may return to the job file 174 of an unaccepted job and cancel the reservation. In another embodiment, the job scheduler 196 does not participate with the node 190 in performing the job, thus, the scheduler 196 is free to cancel other reservations while the node 190 has already begun to work on the accepted job.

In general, the nodes 190 which have accepted a multi-nodal job remain idle (or search for different jobs) until the last node 190 joins the job and creates assignments for each node 190. The last node's responsibility as a primary node 410 will be discussed in greater detail below. After each node 190 receives its respective assignments, at step 350 the nodes 190 pull the executable image 178 and begin to perform the assignments.

In one embodiment, once a node 190 completes an assignment for a multi-nodal job, the node 190 is not free to scan the shared-file system 172 to find another job. Rather, at step 355 the node 190 must wait to be released by the primary node. Again, this will be discussed in greater detail below.

If the node 190 determines that it is the last node 190 to join a job, then at step 340 that node 190 becomes the primary node 410. Accordingly, at step 360 the job scheduler 196 of the primary node configures the job. As illustrated by FIG. 4, the primary node 410 has two responsibilities during the configuration phase of step 360: first, the job scheduler 196 for the primary node 410 arranges the slave nodes $415_{1-3}$ according to the nodal configuration found in the job requirements 176—e.g., a 4×4×4 torus 401—and second, distributes the job assignments to the slave node $415_{1-3}$ that correspond to each position of the multi-nodal structure. Additionally, the job scheduler 196 of the primary node 410 may coordinate any necessary hardware setup. The slave nodes $415_{1-3}$ then pull the executable image 178 and begin to perform their assigned portion of the job.

The conceptual illustration of FIG. 4 shows that the primary node 410 participates in the nodal configuration. In some multi-nodal jobs that comprise of thousands of nodes 190, the primary node 410 may not participate in the performance of the job but rather only configure and monitor the job's progression, thus allowing the job scheduler 196 of primary node 410 to be used much like a centralized job scheduler.

At step 365, the primary node 410 monitors the job's progression. In one embodiment, monitoring the job includes continually inspecting the slave node 415 to ensure none have failed or disconnected. In case of failure, the primary node 410 may modify the job file 174 to indicate that another node 190 is needed. Once a replacement is found, the primary node's job scheduler 196 inserts the new slave node 415 into the nodal configuration so the job may continue. Advantageously, with massively parallel systems such as Blue Gene, the job may continue to progress to some extent even with a missing slave node 415. Moreover, even if the primary node 410 fails, a slave node 415 may be marked as a replacement before the job begins. In such a case, the back-up slave node would already possess a copy of the configuration (i.e., nodal structure and corresponding assignments) established by the primary node 410. Once connection with the primary node 410 is lost, the back-up slave node 415 would use this copy to update its job scheduler 196, find a replacement for the primary node 410, and continue the job's progression. Alternatively, in an embodiment where the primary node 410 only configures and monitors the job but does not initially participate, the primary node 410 may immediately substitute itself into the torus 401 if a slave node 415 fails, thereby eliminating the need to search for a replacement.

Upon completing the job, at step 370 the results from the slave nodes 415 (and in some cases the primary node 410) are compiled to form the requested results. The task of compiling the results may be done by the primary node 410, a slave node 415, or a separate component in the multi-nodal system 170. In a further embodiment, the piecemeal results are transmitted back to the client system 120 to be organized there. Independent of how or when the results are compiled, the primary node 410 notifies the client system 120 that the job is complete. One of ordinary skill in the art will realize that the primary node 410 is not the only component capable of this function, rather any method to alert the client that performs the functions described herein may be used.

At step 375, the job scheduler 196 of the primary node 410 may once again scan the shared-file system 172. However, instead of evaluating a job based on the node's particular characteristics or if the node is idle, the job scheduler 196 assesses a job based on the nodal configuration required to perform the job. For example, if the job that was just completed necessitated a 4×4×4 multi-nodal configuration, then the job scheduler 196 searches for a job that requires this same structure. Advantageously, the primary node 410 has already organized the slave nodes 415 into the necessary configuration, thereby skipping much of the configuration done in step 360. After selecting the job, the slave nodes 415 pull the corresponding executable image 178 and perform the job. In another embodiment, the job scheduler may still consider the nodes' characteristics before selecting a job. For example, even if the job requires the same structure as a previously completed job, the new job may need nodes 190 with greater computational ability.

Because a centralized job scheduler assigns nodes based on the next job in the queue rather than by a node's preferences, assigning a multi-nodal job may take longer with decentralized job schedulers. However, after a primary node 410 creates a multi-nodal configuration, that configuration is maintained until all those jobs are satisfied. Accordingly, at step 355, the slave nodes 415 wait until the primary node 410 releases them, even after completing the assignment. At step 380, the primary node 410 releases the slave nodes 415 after scanning the shared-file system 172 and failing to find applicable jobs.

After a particular node performs several multi-nodal jobs, a job scheduler 196 for that node 190 may store global information gathered by performing those jobs. In one embodiment, the global information includes a list of preferred nodes that a particular node often joins when performing multi-nodal jobs. For example, when making a reservation to participate in a job, the job scheduler 196 may write a nodal ID in the job requirements 176. In this manner, each job scheduler 196 can parse the job requirements 176 and identify the nodes 190 participating in the job. After a plurality of runs, the job scheduler 196 may create a preferred list of nodes that, presumably, have similar characteristics as the node 190. Thus, when deciding whether to accept a new multi-nodal job, the job scheduler can compare the nodal IDs of the nodes 190 that have already signed up to the preferred list. If the node 190 determines that a preferred node has already joined the job, then the node 190 may join without having to continue to evaluate the specific job characteristics, thereby decreasing the time required for a node 190 to accept a job. The opposite is also true. After performing a plurality of jobs, a job scheduler 196 might use the preferred list to determine when not to accept a job. In that case, a job scheduler 196 could quickly scan the nodal IDs, and if the scheduler does not recognize a certain percentage of the IDs, then the scheduler 196 may reject the job without evaluating further the job's characteristics. Granted, if the multi-nodal system 170 was recently updated to include new nodes, then the preferred list may need to be reset. Similarly, if several of the nodes were upgraded to include additional memory or processors a reset may be warranted.

As mentioned previously, this global information may be used to ascertain how often the job scheduler must poll the shared-file system 172. For example, the shared-file system 172 may keep track of the number of nodes performing jobs. If many of the nodes 190 are currently idle, then presumably there are too many nodes 190 competing for too few jobs. Further, if the times at which the nodes 190 scan the database are evenly spaced—e.g., as one node finishes scanning, another has scanned 75% of the file system, another has scanned 50%, and another has scanned 25%—then reducing the frequency of a scan saves energy without causing a new job to wait a significant amount of time. Stated differently, the job schedulers 196 may take turns scanning the shared-file system 172 in intervals. Conversely, if many of the nodes 190 are busy, an idle node 190 may constantly scan to find a job since many of the other nodes 190 are unavailable. Without constant polling, a newly posted job may remain unexecuted for longer periods.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A computer program product for scheduling jobs in a distributed computing environment, the computer program product comprising:
    a computer-readable storage medium having computer-readable program code embodied therewith, the computer-readable program code comprising computer-readable program code configured to:
        scan a file system, by a job scheduler for a first node of a plurality of nodes in the distributed computing environment, to identify data within at least one file in the file system, the data describing a job to be performed by the distributed computing environment, wherein the file system is shared by the plurality of nodes, and wherein each of the plurality of nodes includes a processor, a memory, and a job scheduler specific to the respective node; and
        upon determining that the first node satisfies one or more requirements of the job based on the identified data, select the job by the job scheduler to be run on the first node.

2. The computer program product of claim 1, wherein the identified data further indicates that the job requires at least two nodes to perform the job, and further comprising computer-readable program code configured to:
    distribute an assignment to a second node of the plurality of nodes in the distributed computing environment to perform at least a portion of the job;
    monitor the second node to determine whether the second node completes the assignment; and
    upon determining that second node failed to complete the assignment, redistribute the assignment to a third node of the plurality of nodes.

3. The computer program product of claim 1, wherein determining that the first node satisfies one or more requirements of the job further comprises:
    comparing a characteristic of the job to a preference of the node, wherein selecting the job by the job scheduler is performed responsive to determining that the characteristic of the job matches the preference of the node.

4. The computer program produce of claim 1, wherein the identified data further indicates that the job requires at least two nodes to perform the job, and wherein, after the job scheduler selects the job, a second job scheduler on a second node is configured to:
   select the job to be run on the second node based on the identified data and further based on historical data describing at least one previous interaction between the second node and the first node.

5. The computer program product of claim 1, wherein the job requires at least two nodes to perform the job, and further comprising computer-readable program code configured to:
   generate a reservation for the job, the reservation including a time limit; and
   upon determining that the time limit has expired, deselect the job, by the job scheduler, for execution on the first node.

6. The computer program product of claim 1, wherein the computer-readable program code configured to scan the file system scans the file system in intervals, and wherein the intervals are determined based on (i) a number of unselected jobs in the file system and (ii) a number of the plurality of nodes that are not performing a job.

7. The computer program product of claim 1, wherein the identified data further indicates that the job (i) requires at least two nodes to perform the job and (ii) requires a specified nodal configuration, the specified nodal configuration describing the organization of the at least two nodes that perform the job, and further comprising computer-readable program code configured to:
   configure at least one other node in the plurality of nodes, together with the first node, to operate in the specified nodal configuration;
   distribute a respective assignment to each of the at least other nodes, wherein the each assignment indicates a portion of the job to be performed; and
   such that the job is performed by the first node and the at least one other nodes using the specified nodal configuration.

8. The computer program product of claim 7, further comprising computer-readable program code configured to, after the first node completes the job and while the first node and the at least one other nodes are in the specified nodal configuration:
   scan the shared-file system to identify data describing a second job that requires the specified nodal configuration; and
   upon identifying the data describing the second job that requires the nodal configuration, performing the second job by the first node and the at least one other node, such that the second job is performed using the specified nodal configuration.

9. A system, comprising:
   a computer processor; and
   a memory containing a program that, when executed on the computer processor, performs an operation for scheduling jobs in a distributed computing environment, comprising:
     scanning a file system, by a job scheduler for a first node of a plurality of nodes in the distributed computing environment, to identify data within at least one file in the file system, the data describing a job to be performed by the distributed computing environment, wherein the file system is shared by the plurality of nodes, and wherein each of the plurality of nodes includes a processor, a memory, and a job scheduler specific to the respective node; and
     upon determining that the first node satisfies one or more requirements of the job based on the identified data, selecting the job by the job scheduler to be run on the first node.

10. The system of claim 9, wherein the identified data further indicates that the job requires at least two nodes to perform the job, and the operation further comprising:
   distributing an assignment to a second node of the plurality of nodes in the distributed computing environment to perform at least a portion of the job;
   monitoring the second node to determine whether the second node completes the assignment; and
   upon determining that second node failed to complete the assignment, redistributing the assignment to a third node of the plurality of nodes.

11. The system of claim 9, wherein determining that the first node satisfies one or more requirements of the job further comprises:
   comparing a characteristic of the job to a preference of the node, wherein selecting the job by the job scheduler is performed responsive to determining that the characteristic of the job matches the preference of the node.

12. The system of claim 9, wherein the identified data further indicates that the job requires at least two nodes to perform the job, and wherein, after the job scheduler selects the job, a second job scheduler on a second node is configured to:
   select the job to be run on the second node based on the identified data and further based on historical data describing at least one previous interaction between the second node and the first node.

13. The system of claim 9, wherein the identified data further indicates that the job requires at least two nodes to perform the job, and the operation further comprising:
   generating a reservation for the job, the reservation including a time limit; and
   upon determining that the time limit has expired, deselecting the job, by the job scheduler, for execution on the first node.

14. The system of claim 9, wherein scanning the file system is performed in intervals, and wherein the intervals are determined based on (i) a number of unselected jobs in the file system and (ii) a number of the plurality of nodes that are not performing a job.

15. The system of claim 9, wherein the identified data further indicates that the job (i) requires at least two nodes to perform the job and (ii) requires a specified nodal configuration, the specified nodal configuration describing the organization of the at least two nodes that perform the job, and the operation further comprising:
   configuring at least one other node in the plurality of nodes, together with the first node, to operate in the specified nodal configuration;
   distributing a respective assignment to each of the at least other nodes, wherein the each assignment indicates a portion of the job to be performed,
   such that the job is performed by the first node and the at least one other nodes using the specified nodal configuration.

16. The system of claim 15, the operation further comprising, after the first node completes the job and while the first node and the at least one other nodes are in the specified nodal configuration:

scanning the shared-file system, by the job scheduler of the first node, to identify data describing a second job that requires the specified nodal configuration; and upon identifying the data describing the second job that requires the nodal configuration, performing the second job by the first node and the at least one other node, such that the second job is performed using the specified nodal configuration.

\* \* \* \* \*